April 7, 1925.  
J. D. MADLEM  
1,532,422
CIGAR HEAD FORMING PLATE
Filed May 13, 1924
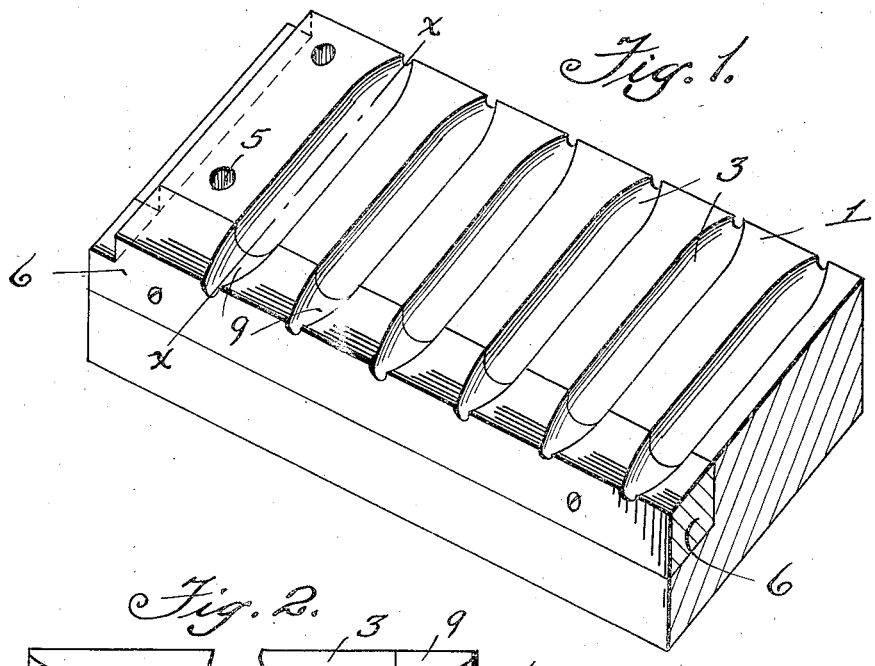
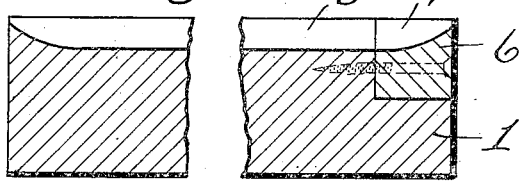
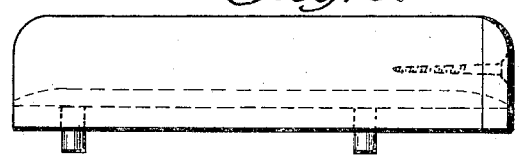
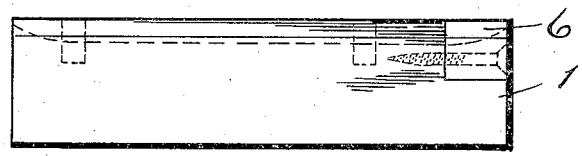
Inventor  
John D. Madlem,  
By *[signature]*, Attorney Patented Apr. 7, 1925.

1,532,422

UNITED STATES PATENT OFFICE.

JOHN D. MADLEM, OF LITITZ, PENNSYLVANIA.

CIGAR-HEAD-FORMING PLATE.

Application filed May 13, 1924. Serial No. 712,921.

*To all whom it may concern:*

Be it known that I, JOHN D. MADLEM, a citizen of the United States, residing at Lititz, in the county of Lancaster and State of Pennsylvania, have invented certain new and useful Improvements in Cigar-Head-Forming Plates, of which the following is a specification.

This invention relates to improvements in cigar molds, such as are in common use in forming or molding the "bunches" from which the cigar is finally formed.

These molds are usually made of wood, formed in two registering and co-acting parts, and in one of which a series of relatively large depressions are formed, and into which the bunches are laid as they are made up. The other portion is provided with relatively shallow depressions, and forms what may be termed the upper or cover portion.

When the bunches have been placed in the mold and the two parts brought together, the projecting ends of the bunches, at what is termed the "head" of the cigar, are cut off by means of a keen blade drawn along the edge of the mold. This process eventually destroys the edges of the mold and it becomes useless.

In my present invention I have devised a combined head forming and shearing plate which may be placed in a longitudinal depression in the edge of the lower or main portion of the mold, and which is removable, so that when a mold is provided with my device, the formation of the head may easily be determined by the plate used, while the metal plate will serve as a shearing surface for the cutting blade, and inasmuch as these plates are removable and can be replaced at will, it is evident that the life of a mold is very decidedly prolonged.

The invention is more fully described in the following specification and clearly illustrated in the accompanying drawing, in which:—

Figure 1 is a perspective view of a portion of the main part of the mold, with my head forming and shearing plate in position therein.

Figure 2 is a sectional view taken through the line X—X of Figure 1.

Figure 3 is an end view of the mold, showing the cover portion ready to be placed in position.

The numeral 1 designates the body portion of the mold, which is formed with the usual series of parallel depressions 3, into which the roughly made bunches are placed as formed.

The depressions in the main portion of the mold are relatively deep, sufficiently deep in fact to accommodate almost the entire diameter of the bunch, while the depressions in the cover portion are relatively shallow, being just sufficiently deep to complete the contour of the cigar bunch.

The main portion and cover are provided with positioning means, as usual, in the form of depressions 5 in one portion and registering pins on the other portion.

In the one longitudinal face of the main portion of the mold, along the edge at which the heads of the cigars are to be formed, I form an angular depression and into this I fit a metal plate 6, which thus forms the surface along which the cutting or shearing blade is passed, when the ends of the bunches are cut off.

This shearing plate however performs a more important function, in that, while it is removable and may be replaced with another, it provides a positive means for forming the so-called "head" of the cigar, each plate having a series of depressions 9 which, when the plates are in position on the mold, register with the ends of the depressions 3 in the mold, so that, to form cigars with varied or different shaped heads, it will not be necessary to have a mold for each shape, but by means of this interchangeable plate, one mold may be used for any number of shapes by merely placing the desired plate in position thereon.

I am aware that cigar molds have been made in which a cutter is provided, so that when the two parts of the mold are brought together the ends will be cut off. This construction is unsatisfactory, even when the cutting or shearing only is taken into consideration.

In my present invention however, I have, in addition to a very simple and most effective cutting or shearing feature, also provided a device whereby a single mold may be utilized to form cigar bunches with any shape head desired, by the mere interchanging of the shearing plate.

The mode of securing the plate in position is of course not essential, any simple means may be employed, and I have shown it held by screws, which may be easily withdrawn.

Having thus fully described my invention and its operation, what I claim and desire to secure by Letters Patent is:—

1. A head-forming plate for cigar molds, consisting of a rectangular strip of metal formed with a series of equidistant head-forming depressions in one face thereof and means for securing it in a recess cut in the face of a mold, whereby an old mold is reconditioned.

2. As a new article of manufacture, a cigar head forming device, consisting of a rectangular metal plate having a series of equidistant head-forming depressions therein and provided with means for securing it in a recess in the face of a cigar mold.

In testimony whereof I affix my signature.

JOHN D. MADLEM.